United States Patent
Ono

(10) Patent No.: US 6,389,958 B1
(45) Date of Patent: May 21, 2002

(54) HEAT COOKING/STERILIZING DEVICE

(75) Inventor: Takuji Ono, Okayama (JP)

(73) Assignee: Ono Foods Industrial Co., Ltd., Okayama (JP)

( * ) Notice: Subject to any disclaimer, the term of this patent is extended or adjusted under 35 U.S.C. 154(b) by 0 days.

(21) Appl. No.: 09/926,840

(22) PCT Filed: Jul. 21, 1999

(86) PCT No.: PCT/JP99/03902

§ 371 Date: Dec. 31, 2001

§ 102(e) Date: Dec. 31, 2001

(87) PCT Pub. No.: WO01/05285

PCT Pub. Date: Jan. 25, 2001

(51) Int. Cl.[7] ............ A47J 27/14; A23L 1/00
(52) U.S. Cl. ............ 99/330; 99/331; 99/337; 99/342; 99/352; 99/355; 99/468; 99/486; 99/487; 99/516; 99/534; 422/26; 422/105; 422/295
(58) Field of Search .......... 99/327–333, 337, 99/338, 342, 352–355, 467, 468, 472, 485–487, 516, 534–536; 422/105, 112–116, 119, 26, 295–298; 426/231, 332, 335, 320, 532, 615

(56) References Cited

U.S. PATENT DOCUMENTS

| | | | | |
|---|---|---|---|---|
| 4,316,871 A | * | 2/1982 | De Fraites ............ | 422/26 |
| 4,505,193 A | * | 3/1985 | Mariotti ............ | 99/330 |
| 4,520,717 A | * | 6/1985 | Bohrer, Jr. et al. ....... | 422/26 X |
| 4,539,989 A | * | 9/1985 | Bishop et al. ............ | 99/407 |
| 4,668,390 A | * | 5/1987 | Hurley et al. ............ | 99/330 X |
| 5,165,329 A | * | 11/1992 | Jacob et al. ............ | 99/407 |
| 5,297,474 A | * | 3/1994 | Tabuchi ............ | 422/295 X |
| 5,367,949 A | * | 11/1994 | Nitschke et al. ........ | 99/468 X |
| 5,379,684 A | * | 1/1995 | Ettridge ............ | 99/413 |
| 5,452,648 A | * | 9/1995 | Hohler et al. ............ | 99/408 |
| 5,584,234 A | * | 12/1996 | Baillieul et al. ........ | 99/403 |
| 5,613,424 A | * | 3/1997 | Chameroy ............ | 99/337 |
| 5,839,357 A | * | 11/1998 | Ha et al. ............ | 99/337 |

FOREIGN PATENT DOCUMENTS

| | | | |
|---|---|---|---|
| JP | 59-73230 | * | 5/1984 |
| JP | 3-30628 | * | 2/1991 |

* cited by examiner

Primary Examiner—Timothy F. Simone
(74) Attorney, Agent, or Firm—Jones, Tullar & Cooper, P.C.

(57) ABSTRACT

A hermetic type of cooking vessel with numerous nozzles arranged therein, and conduits which open at these nozzles are connected to a cold water source, a hot water source, a seasoning liquid source, a steam source, a superheated steam source and a heated nitrogen source via associated switching means. With this vessel food material is heated evenly without agitating the food material; and automatically heated with this vessel and cooked with accuracy. Thus, the food material is showered with the heated seasoning liquid and other cooking gases and liquids, and the used seasoning liquid is collected from the bottom of the cooking vessel to be reheated. The so reheated seasoning liquid is made to return to the cooking vessel. The cooking vessel is equipped with a food material temperature sensor, a pressure sensor and such like. In response to the signals from these sensors the temperatures of the seasoning liquid, hot water, steam, superheated steam, superheated nitrogen and cold water are controlled and these liquid and gases are supplied to the nozzles according to the sequencer program. Thus, the food material is disinfected and cooked in the cooking vessel under controlled pressure.

5 Claims, 4 Drawing Sheets

HEAT COOKING/STERILIZING DEVICE

TECHNICAL FIELD

The present invention relates to a heating, cooking and disinfecting apparatus in which: cooking and disinfection are performed in one and the same large cooking vessel; the seasoning liquid remaining on the bottom of the cooking vessel is collected, heated and returned to the cooking vessel, thereby saving and making full use of the seasoning liquid; and the food material is evenly heated and cooked well.

BACKGROUND OF THE INVENTION

A conventional cooking vessel has a double-shelled structure to define a heating space called "Jacket" surrounding the cooking vessel body, and the cooking is effected by filling the "Jacket" space with a heating medium such as steam, thereby allowing the heat to transfer from the "Jacket" to the inside of the cooking vessel. The cooking vessel for use in business is so large in size that heat cannot be distributed evenly in the cooking vessel so far as the "Jacket" is used as a heat source, and therefore it is necessary to agitate the food material in the cooking vessel while cooking.

The agitation, however, causes pieces of food to be deformed, and their appearance is pleasing less and less. Also, disadvantageously the seasoning liquid is degraded as pulverized food is mixed with seasoning liquid.

Still disadvantageously the agitation in the cooking vessel prevents the drift measurement of the food temperature because the food is flowing ceaselessly, and therefore, the temperature of the food is assumed indirectly from the temperature of the seasoning liquid in the cooking vessel. This is inconvenient in determining how the cooking has been developed in the cooking vessel.

In view of the above one object of the present invention is to provide a heating, cooking and disinfecting apparatus in which: the temperature in the cooking vessel can be raised: quickly to heat the inside of the cooking vessel evenly; the cooking and disinfection can be effected well with a relatively small quantity of seasoning liquid, and different types of cooking such as boiling, steaming or baking can be effected in one and same came cooking vessel.

SUMMARY OF THE INVENTION

To attain the object described abduce a heating, cooking and disinfecting apparatus according to the present invention is constructed as follows:

a hermetic type of pressurizing-and-depressurizing cooking vessel has a plurality of nozzles arranged inside, and these nozzles are jointed together to a supply conduit assembly, and the cooking vessel has a return conduit and a drain outlet provided on its bottom;

a heat exchanger whose inlet and outlet are connected to the return conduit and the supply conduit assembly respectively, thereby forming a circulation channel;

there is provided water supply, a seasoning liquid supply, a steam supply, a cold water supply, a superheated vapor supply and a heated nitrogen supply;

the water supply and the seasoning supply are arranged so as to be connected alternatively to the circulation channel via associated valves whereas the steam supply, cold water supply, superheated vapor supply and heated nitrogen supply are so arranged that any one of these supplies and the outlet of the heat exchanger may be connected alternatively to the circulation channel just downstream of the supply conduit assembly;

the cooking vessel has a temperature detecting sensor, a pressure detecting sensor and a nitrogen concentration detecting sensor installed therein; and a control is responsive to signals from all of the detecting sensors for permitting the nozzles to shower the food material with the seasoning liquid, water, steam, superheated vapor, heated nitrogen or cold water according to the sequencer program, thereby cooking and disinfecting the food material in the cooking vessel.

The supply conduit assembly includes a center supply conduit standing upright at the center of the cooking vessel and a plurality of surrounding supply conduits arranged on the inner circumference of the cooking vessel, and the nozzles of the surrounding supply conduits are arranged in radial directions to surround the center supply conduit, so that the radial nozzles are distributed evenly within the cooking vessel.

An annular food-accommodating shelf assembly is put in the cooking vessel, and the center supply conduit stands in the center circular space of the shelf assembly and the surrounding supply conduits are arranged around the annular shelf assembly.

The shelf assembly has a plurality of shelves, and the nozzles are arranged at the levels of the shelves.

Each shelf has numerous holes made therein, thereby allowing the seasoning liquid to flow down from shelf to shelf.

DETAILED DESCRIPTION OF THE INVENTION

Figure 1:
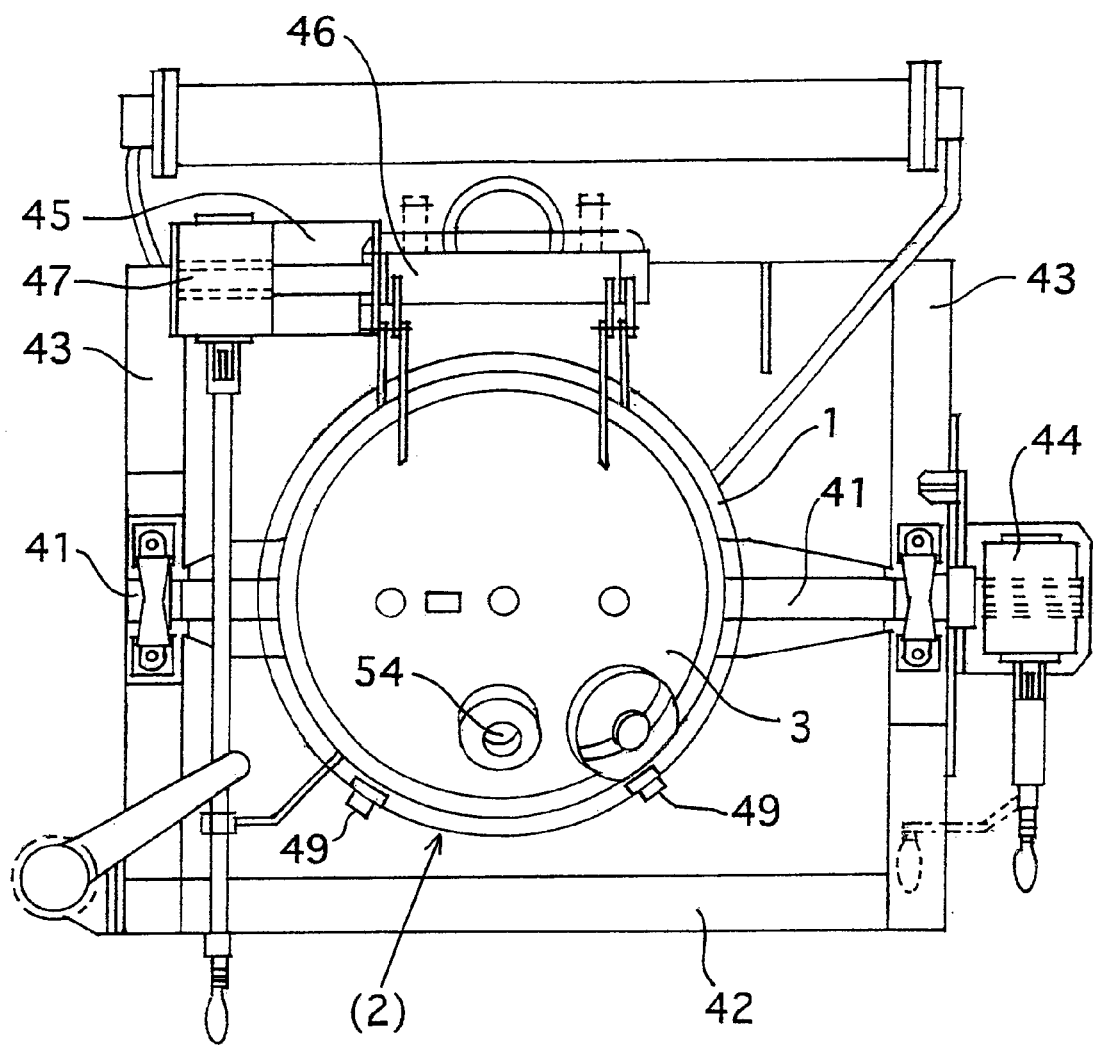
FIG. 1 is a plane view of a heating, cooking and disinfecting apparatus according to the present invention.

Referring to the drawings, a heating, cooking and disinfecting apparatus includes a hermetic, pressurizing-and-depressurizing cooking vessel 1. It has a food material accommodating space 2 defined inside, and the food material accommodating space 2 can be closed hermetically when the cover or lid 3 of the cooking vessel 1 is closed. The cooking vessel 1 has rotary axles 41 projecting from its opposite sides. The cooking vessel 1 is rotatably supported by the opposite support stands 43 rising upright from the base frame 42 with the opposite rotary axles 41 born on the journals of the tops of the opposite support stands 43. One of the opposite rotary axles 41 (right side in FIG. 1) has a first worm reduction unit 44 fixed thereto.

A hinge support 45 is provided behind the cooking vessel 1. It comprises a hinge mechanism 46 and an associated worm reduction unit 47, and the lid 3 of the cooking vessel 1 is connected to the hinge mechanism 46.

The cooking vessel 1 has a heat-resistant rubber gasket 48 fixed to its circumferential edge, and a latch 49 fixed to the side opposite to the hinged side, thus permitting the lid 3 to close the cooking vessel 1 hermetically when the lid 3 is closed.

A pressure-reduction unit 12 such as a vacuum pump is connected to the lid 3 via an associated release valve 11. The cooking vessel 1 is connected to a nitrogen or air supply 13 via a nitrogen feeding valve 14, and the cooking vessel 1 can be released to the surrounding atmosphere via an exhaust valve 15. The lid 3 has a monitoring window 54 made therein, thereby permitting a person to watch inside.

A heat exchanger 28 is fixed to the base frame 42 behind the cooking vessel 1.

A center supply conduit 4 stands upright at the center of the food material accommodating space 2. The center supply conduit 4 has its top end closed and numerous nozzles 5 are fixed to the center supply conduit 4, extending therefrom in all radial directions. A plurality of surrounding supply conduits 6 converge to the bottom end of the center supply conduit 4. These surrounding supply conduits 6 are arranged along the inner wall of the cooking vessel. Each of these surrounding supply conduits 6 has numerous nozzles 5 directed inward. Each nozzle 6 has an elliptical opening.

A food shelf assembly has a plurality of shelves arranged at different levels, and the food shelf assembly can be put at the center of the food material accommodating space 2. All the nozzles are arranged to be at same levels as the shelves.

In a case where the cooking vessel 1 has a relatively small capacity, the center supply conduit 4 or the surrounding supply conduits 6 may be omitted.

The bottom end of the center supply conduit 4 projects from the bottom of the cooking vessel 1, and is connected to the outlet of the heat exchanger 28 via a seasoning liquid feeding valve 20. Likewise, the bottom end of the center supply conduit 4 is so connected to a steam supply 39, a superheated vapor supply 17, a heated nitrogen supply 19 and a cold water supply 23 via associated switching valves 40, 16, 18 and 21 respectively.

The cooking vessel 1 has a return conduit 7 and a blast-and-drain conduit 8 fixed to its bottom. The blast-and-drain conduit 8 can be opened to the surrounding atmosphere by opening an associated drain valve 9. The return conduit 7 has a net attached to its inlet. The return conduit 7 is connected to the suction side of a circulation pump 27 via a strainer 29, and the ejection side of the circulation pump 27 is connected to the inlet of the heat exchanger 28. The outlet of the heat exchanger 28 is connected to the supply conduit assembly, which comprises the center supply conduit 4 and the surrounding supply conduits 6. Thus, a circulation channel 22 is provided between the cooking vessel 1 and the heat exchanger 28. A seasoning liquid tank 24 is connected on its outlet side to the circulation channel 22 via an associated filter 30, and is connected on its inlet side to a seasoning liquid collecting tank 25 via an associated valve 34a. A water tank 24 is connected to the circulation channel 22 via the seasoning liquid tank 24.

A plurality of annular shelves are separated from each other in the food shelf assembly, and the annular shelves are separated from the bottom and inner wall of the cooking vessel 1. The food shelf assembly is suspended in the food material accommodation space.

The cooking vessel 1 and lid 3 are covered with thermal insulating material to prevent radiation of the heat while cooking.

Figure 2:
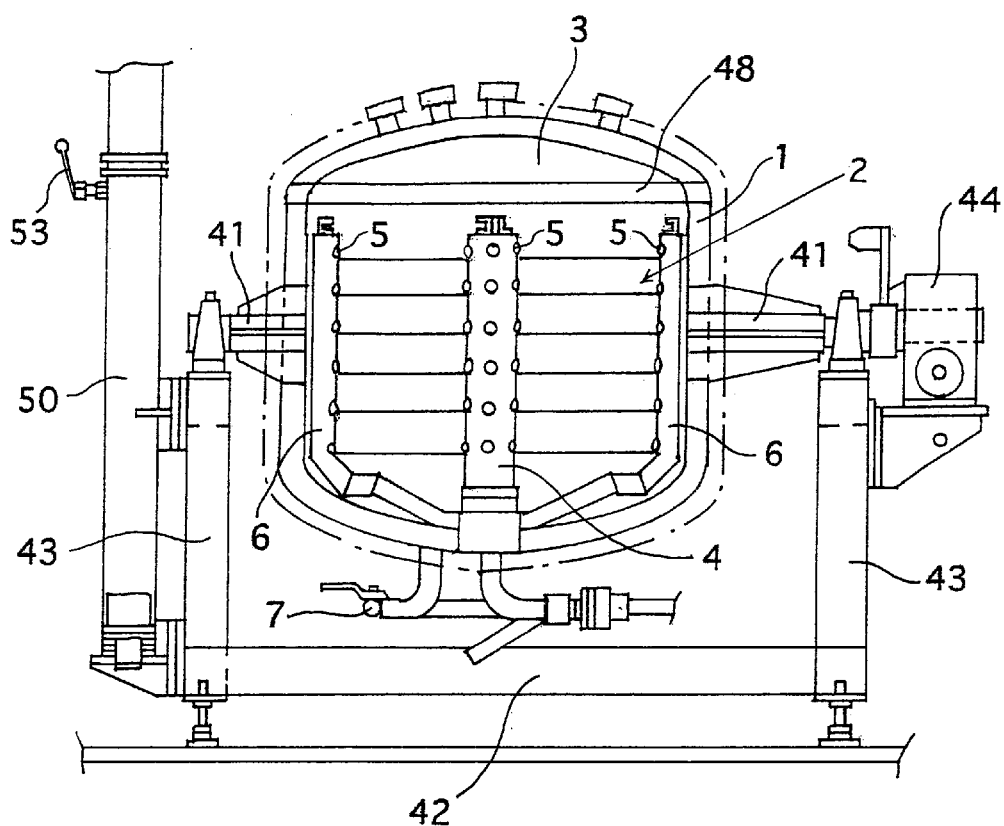
FIG. 2 is a sectional view of the heating, cooking and disinfecting apparatus.
Figure 3:
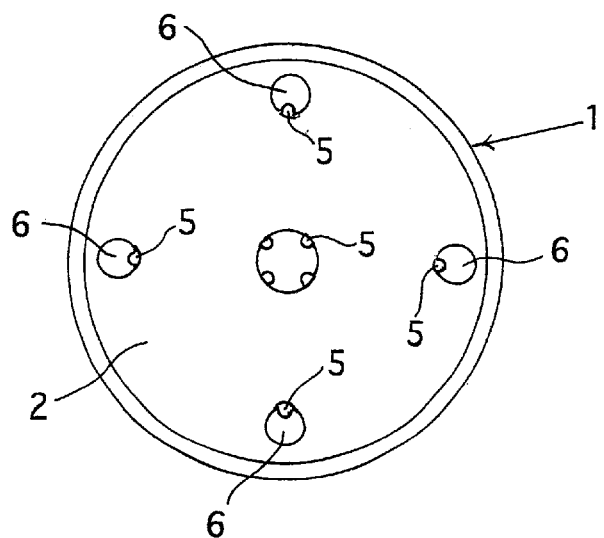
FIG. 3 is a plane view of the cooking vessel with its lid open.
Figure 4:
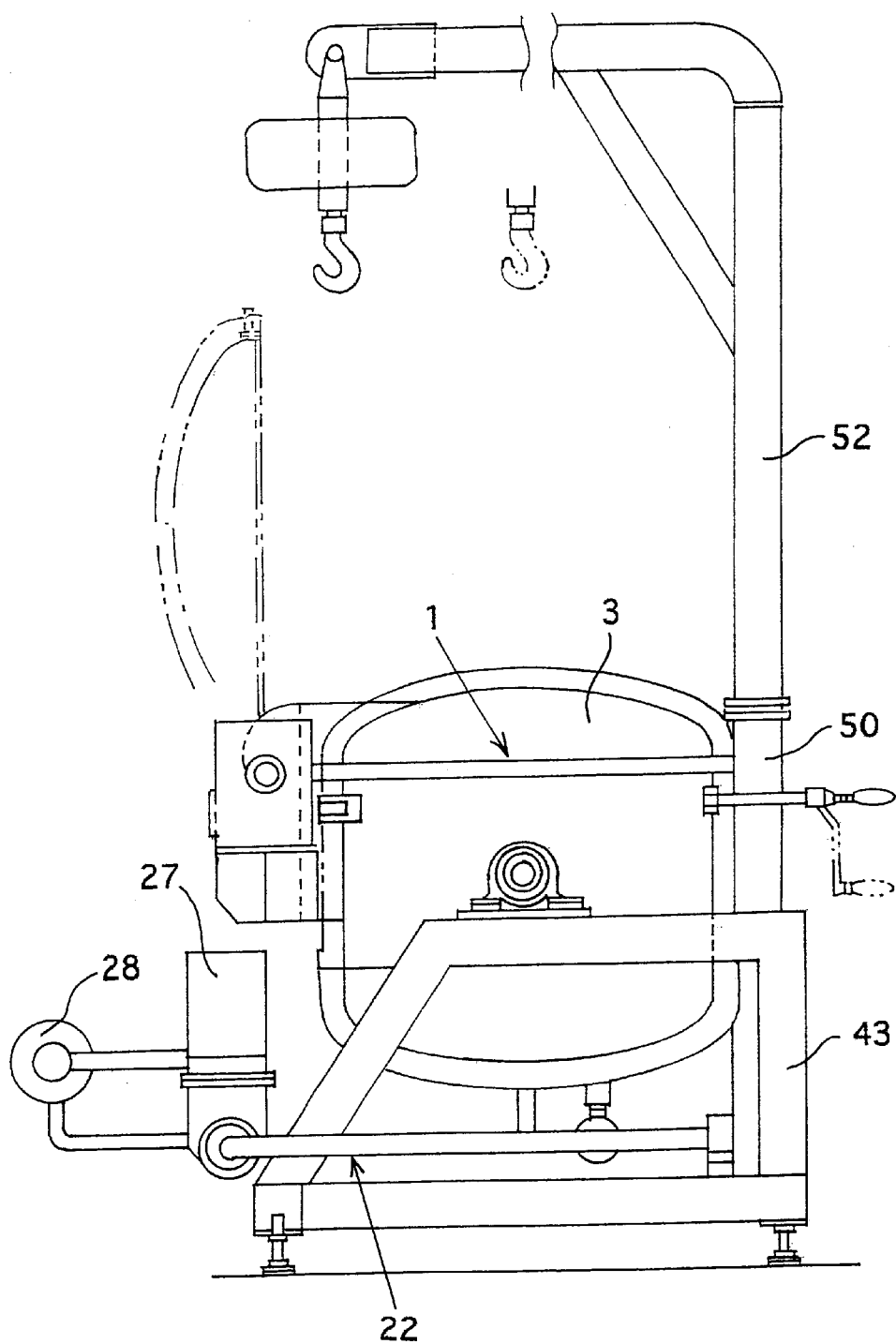
FIG. 4 is a side view of the cooking vessel.
Figure 5:
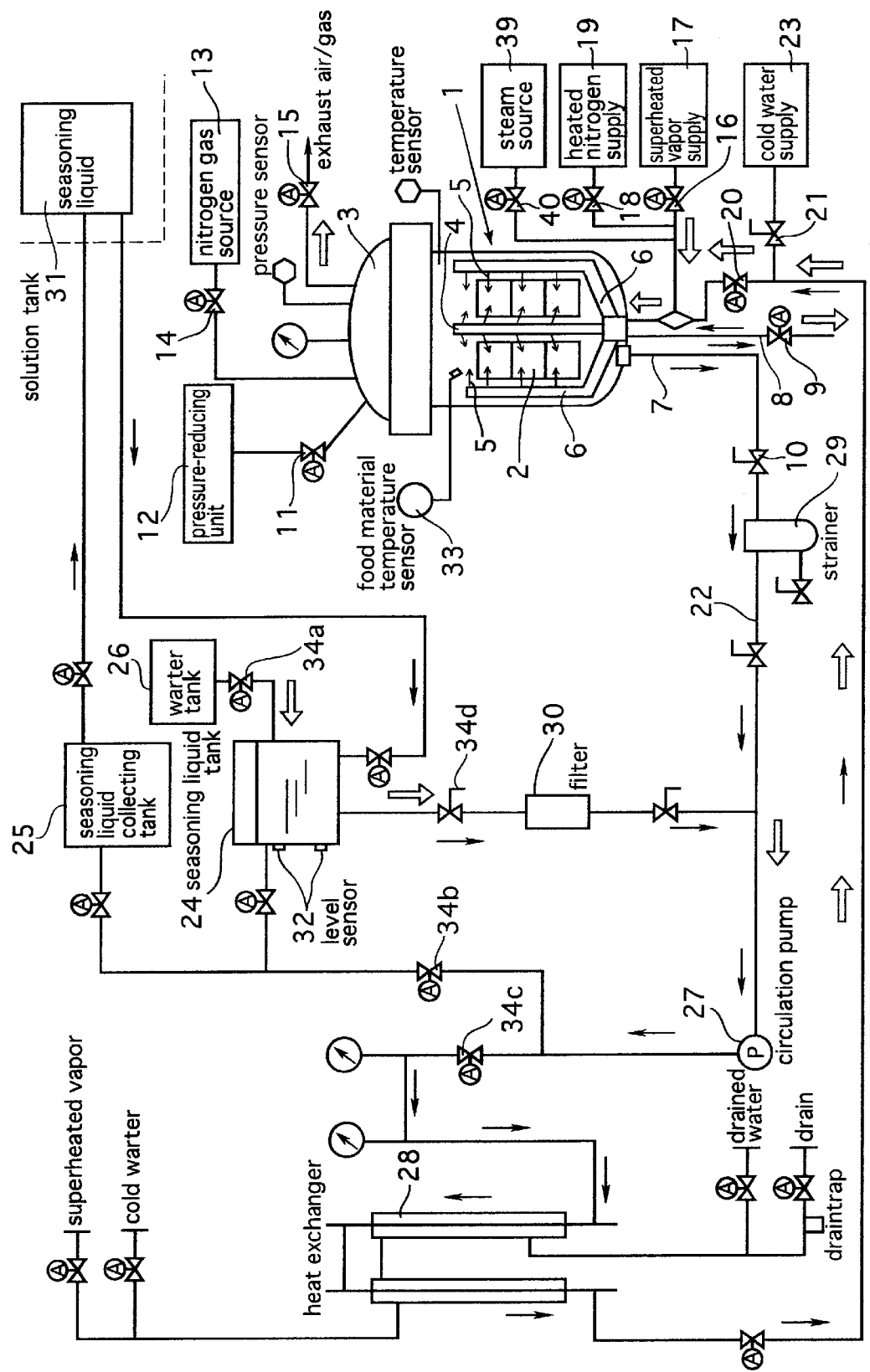
FIG. 5 illustrates how the parts of the heating, cooking and disinfecting apparatus are connected to each other.

As seen from FIG. 4, a hollow support cylinder 50 is fixed to the base frame 42, and an L-shaped post 52 is fitted in the hollow support cylinder 50. The L-shaped post 52 is supported rotatably by thrust bearing in the hollow support cylinder 50. The L-shaped post 52 has a chain block 51 suspending from its lateral arm. The post 52 has a rotary handle 53 fixed to its trunk at right angle (see FIG. 2).

Before putting the food material in the cooking vessel 1 the lid 3 is closed to hermetically seal the cooking vessel 1, and 120° C. high-steam is fed from the superheated vapor supply 17 to the inside of the cooking vessel 1 to eject from the nozzles of the center and surrounding supply conduits 4 and 6. The showering of superheated steam continues 5 minutes to effect a required disinfection, which may be omitted, provided that the cooking vessel 1 has been disinfected immediately after completion of the previous cooking.

After disinfection pieces of food material are put on the annular shelves, and then, the food shelf assembly is put in the cooking vessel 1, allowing the center supply conduit 4 to enter the center hole of the food shelf assembly.

Then, the cooking vessel 1 is evacuated by using an associated vacuum pump (not shown). Thereafter, the food accommodating space is filled with nitrogen by opening the nitrogen feeding valve 14.

(Example 1)

In boiling black bean or soybean the food material is soaked one night in water, and the water-pregnant beans are put in the cooking vessel 1. At first, the food material thus put in the cooking vessel 1 is softened by heated water to remove unpleasing taste. The hot water is prepared by pumping water from the water tank 26 to the heat exchanger 28 via the empty seasoning liquid tank 24. The heat exchanger 28 is supplied with steam as thermal medium from the outside, and the heat is transferred to the water to provide hot water which is directed to the center and surrounding supply conduits 4 and 6 to shower the food material put on the shelves. Each nozzle 5 has an elliptical hole to allow the hot water to diverge in the form of fan, thereby spreading evenly over the food material on the shelves.

The hot water falling on the bottom of the cooking vessel 1 returns to the heat exchanger 28 via the circulation channel 22 so that the water may be heated again there. The so reheated water returns to the cooking vessel 1.

After completing the softening of the food material the steam is prevented from flowing to the heat exchanger 28, and then, cold water is directed to the cooking vessel 1 via the heat exchanger 28, thereby cooling the inside of the cooking vessel 1.

After cooling the cooking vessel 1 the remaining water is removed from the cooking vessel 1 via the blast-and-drain conduit 8, and then fresh water is directed from the cold water tank 23 to the cooking vessel 1 to shower the food material inside with the fresh, cold water. Used water is drained through the blast-and-drain conduit 8. The rinse may be repeated two or more times.

After completing the washing of food material the seasoning liquid is directed from the seasoning liquid tank 24 to the heat exchanger 28 and to the cooking vessel 1 via the circulation channel 22 to spread the heated seasoning liquid over the food material in the cooking vessel 1.

Thus, the food material is evenly heated and cooked in the cooking vessel 1.

Seasoning liquid is prepared in a solution tank 31, which is located outside of the heating, cooking and disinfecting apparatus, and the so prepared seasoning liquid is directed to the seasoning liquid tank 24 until the seasoning liquid has reached a predetermined level in the tank 24. The seasoning liquid remains at the predetermined level all the time; an associated level sensor 32 keeps watching the liquid level.

The seasoning liquid is drawn by the circulation pump 27 via the valve 34b to be directed to the heat exchanger 28, where the heat is transferred from the steam flowing on the primary side of the heat exchanger to the seasoning liquid flowing on the secondary side of the heat exchanger.

The valve 20 is opened to allow the heated seasoning liquid to flow to the center and surrounding supply conduits 4 and 6, thus showering the food material with the heated seasoning liquid.

The temperature sensor detects the temperature inside of the cooking vessel 1 to send a signal representing the temperature to an operation console, thereby controlling the heating temperature of the heat exchanger 28.

The seasoning liquid remaining on the bottom of the cooking vessel 1 is directed to the strainer 29 via the return conduit 7 to remove the pulverized food material from the seasoning liquid, and then the filtrated seasoning liquid is pumped and directed to the heat exchanger 28 via the circulation channel 22. Then, the seasoning liquid is reheated to flow to the cooking vessel 1.

After a predetermined length of time has passed, the cooking is finished, and then cold water is directed to the primary side of the heat exchanger 28 to cool the circulating seasoning liquid, and the seasoning liquid is collected in the seasoning liquid collecting tank 25. Specifically the collection of the seasoning liquid is effected as follows: the valve 34d downstream of the seasoning liquid tank 24, and the valve 34c upstream of the heat exchanger 28 are closed, and the valve 34b upstream of the circulation pump 27 is opened. Then, the circulation pump 27 is put in operation to pump the seasoning liquid to the seasoning liquid collecting tank 25.

Thereafter, the lid 3 is opened to pull up and take out the food shelf from the cooking vessel 1 by the hoist or winch, and the cooked food is stored in a storage without delay.

In a case where broiled chickens are prepared, the chickens are exposed to superheated steam subsequent to collection of the seasoning liquid. Specifically the cooking vessel 1 is evacuated, and the valve 14 is opened to allow the nitrogen gas source 13 to supply nitrogen gas to the cooking vessel 1. Thus, the cooking vessel 1 is filled with nitrogen gas.

Then, the valve 16 is opened to allow the superheated steam source 17 to direct superheated steam to the center and surrounding feeding conduits 4 and 6. Thus, the food material is showered with superheated steam from the nozzles 5 of the center and surrounding feeding conduits 4 and 6.

Superheated steam along with nitrogen gas is directed to the cooking vessel 1 to heat the food material in the nitrogen atmosphere, thus preventing the food material from being oxidized while being heated.

The cooked food has been primarily disinfected already, and the so primarily disinfected cooked food can be preserved 15 to 20 days long in chiller showcases (3° C.), and three months in frozen preservation (−20° C.), provided that such cooked food is wrapped or held in some kind of containers or bags, which are made of KOP or other materials of barrier properties.

If such primarily disinfected food is wrapped with sheets of vinyl or alumina, and if the so wrapped food is secondarily disinfected (by pasteurizing at 90° C.), its shelf life will be 1–2 months long, and will be 3–6 months long, provided that the cooked food is disinfected in an air-atmosphere cooking-and-disinfecting apparatus as proposed in Japan Patent Application Laid-Open No. H-7-231770.

The spreading of the heated seasoning liquid, steam and superheated steam over the food material in the cooking vessel permits the surrounding atmosphere to be used as heat source. Thus, the food material can be cooked quickly.

The food material is cooked while remaining on the food shelf assembly, and therefore, no pulverized food material can be produced while cooking. Also, advantageously the cooking in the nitrogen atmosphere has the effect of suppressing extra oxidization and tanning of the food material, allowing the cooked food material to retain its natural properties such as shape or pleasing teeth-biting.

In a case where the food material is baked, roasted or non-fried, the circulation pump 27 is made to cease, thereby stopping the spray of the seasoning liquid, and then, the superheated steam or heated nitrogen is supplied from the superheated steam source 17 to the center and surrounding feeding conduits 4 and 6 via the valve 16, thus providing a dry, high-temperature condition in the food material accommodating space 2. Then, a required cooking starts. Also, the food material can be smothered or steamed by supplying steam from the steam source 39 to the food material accommodating space 2 via the valve 40.

When the temperature in the cooking vessel 1 descends to a predetermined temperature, an evacuation valve 15 is opened to allow the pressure in the cooking vessel 1 to return to the surrounding pressure. Then, the lid is opened to take out and transfer the food shelf to a sanitary storage container by the hoist or winch. The sanitary storage container is useful in preventing the cooked food from the secondary contamination by surrounding bacteria while being transferred.

The food material accommodating space 2 is evacuated by the pressure-reducing unit 12 via the valve 11, so that the food material may be cooked at a low temperature (below 100° C.). The low-temperature cooking is advantageous to promotion of impregnation of the seasoning liquid into the food material, and is advantageous to protection of the food material against syrupy-tanning.

(Example 2) Flavored, Roasted Peanuts

Peanuts were soaked one night in water.
1) Cooking vessel disinfected 5 minutes at 120° C. with steam showering
2) Removal of unpleasing flavor and softening effected 20 minutes at 100° C. by steam showering.
3) Cooling 10 minutes by cooling hot water in heat exchanger
4) Washing 5 minutes by cold water showering
5) Flavoring 10 minutes at 60° C. with seasoning liquid showering
6) Roasting 10 minutes at 190° C. with superheated-and-heated nitrogen showering
7) Taking out (Example 3) Tangle Roll
1) Cooking vessel disinfected 5 minutes at 120° C. with steam showering
2) Flavoring 30 minutes at 110° C. with seasoning liquid showering
3) Primary cooling effected 5 minutes down to 90° C. with heat exchanger
4) Secondary cooling effected 10 minutes down to 40° C. by showering at reduced pressure (seasoning liquid condenced)
5) Collecting used seasoning liquid
6) Taking out (Example 4) Broiled Chicken
1) Cooking vessel disinfected 5 minutes at 120° C. with steam showering
2) Removal of unpleasing taste and softening effected 30 minutes at 80° C. by hot water showering.
3) Cooking vessel cooled 5 minutes down to 40° C. by cooling hot water in heat exchanger
4) Cooking vessel washed 5 minutes with cold water showering 5) Flavoring 20 minutes at 110° C. with seasoning liquid showering
6) Cooling used seasoning liquid by heat exchanger and collecting cold seasoning liquid
7) Roasting 10 minutes at 200° C. with superheated steam-and-heated nitrogen showering
8) Taking out (Example 5) Baked Sweet-Potatoes
1) Cooking vessel disinfected 5 minutes at 120° C. with steam showering
2) Baking 30 minutes at 230° C. with superheated steam-and-heated nitrogen showering.
3) Cooling 15 minutes at reduced pressure
4) Taking out (Example 6) Baked Corn
1) Cooking vessel disinfected 5 minutes at 120° C. with steam showering
2) Steaming 10 minutes at 120° C. with steam showering
3) Baking 10 minutes at 200° C. with superheated steam-and-heated nitrogen showering
4) Cooling 15 minutes at reduced pressure
5) Taking out (Example 7) Baked Potato
1) Cooking vessel disinfected 5 minutes at 120° C. with steam showering
2) Steaming 10 minutes at 120° C. with steam showering
3) Baking 10 minutes at 230° C. with superheated steam-and-heated nitrogen showering
4) Cooling 15 minutes at reduced pressure
5) Taking out (Example 8) Boiled Pig Dices
1) Cooking vessel disinfected 5 minutes at 120° C. with steam showering
2) Roasting 10 minutes at 230° C. with superheated steam-and-heated nitrogen showering
3) Steaming 20 minutes at 110° C. with steam showering
4) De-fatting and softening 60 minutes at 100° C.
Cooling 10 minutes (water cooled by heat exchanger)
6) Flavoring and cooking 20 minutes at 105° C. by seasoning liquid showering
7) Cooling 10 minutes (water cooled by heat exchanger)
8) Collecting used seasoning liquid
9) Taking out (Example 9) Mackerel Seasoned with Salt and Broiled
1) Cooking vessel disinfected 5 minutes at 120° C. with steam showering
2) Steaming 15 minutes at 100° C. with steam showering
3) Cooling 5 minutes at reduced pressure (dewatering)
4) Broiling 15 minutes at 220° C. with superheated steam-and-heated nitrogen showering
5) Cooling at reduced pressure
6) Taking out (Example 10) Sweet-Boiled Chestnuts
1) Cooking vessel disinfected 5 minutes at 120° C. with steam showering
2) Removing unpleasing flavor 30 minutes at 95° C. by hot water showering; and softening 15 minutes at 90° C. by hot water showering
3) Flavoring and cooking 60 minutes at 90° C. by seasoning liquid showering
4) Cooling (water cooled by heat exchanger)
5) Taking out (Example 11) Flavored, Boiled Fish
1) Cooking vessel disinfected 5 minutes at 120° C. with steam showering
2) Steaming 5 minutes at 100° C. by steam showering
3) Flavoring and cooking 20 minutes at 100° C. by seasoning liquid showering
4) Cooling 10 minutes (water cooled by heat exchanger)
5) Collecting used seasoning liquid
6) Taking out (Example 12) Disinfection of "chirimennjyako" (very small, white fish)
1) Cooking vessel disinfected 5 minutes at 120° C. with steam showering
2) Reduction of the inner pressure of the cooking vessel (5 minutes)
3) Disinfection at 110° C. with steam showering (5 minutes)
4) Cooling at reduced pressure
5) Taking out As may be understood from the above, in heating, cooking and disinfecting apparatus according to the present invention the food material in the cooking vessel is showered evenly with seasoning liquid, steam, superheated steam or heated nitrogen, thereby heating the inside of the cooking vessel evenly to use the inner space of the cooking vessel as spatial heating source for heating the food material directly. Therefore, no agitation is required, and the cooked food is guaranteed to be free of deformation or less-pleasing appearance which would be caused by agitation.

Ejection of seasoning liquid from the nozzles to the food material permits quick cooking. The food material can be "baked" or "broiled" by showering the food material with superheated steam or heated nitrogen in one and same cooking vessel, in which the food material can be boiled, too.

The cooking vessel is filled with nitrogen, and the food material is cooked in the nitrogen atmosphere so that the food material and the seasoning liquid may be prevented from being oxidized and browned. Thus, the food material remains unchanged in color.

The cooking vessel is disinfected in the nitrogen atmosphere by showering with the superheated steam, and the food material can be cooked in such a disinfecting condition that the value of $F_0$ is equal to or more than 4.

Used seasoning liquid is collected via the filter to be used repeatedly, and therefore, a relatively small quantity of seasoning liquid may be used effectively.

The circulation channel has some filters to remove pulverized food material or particles of foreign substance from the seasoning liquid, thereby preventing the baking-and-clinging of such impurities to the cooking vessel.

While the food material being cooked, the concentration of the seasoning liquid can be controlled to remain unchanged, thus assuring that the quality of cooked food be unchanged.

The heating, cooking and disinfecting apparatus is so constructed that "boiling" (cooking above 100° C. or cooking below 100° C. at reduced pressure), washing, steaming, "baking" or "broiling" (showering with superheated steam or heated nitrogen), and some kind of pre-treatments, that is, steaming-and-disinfecting, vacuum-cooling and condensation of seasoning liquid may be automatically carried out alone or in combination according to the sequencer program The I.O.D console has a display to show on real time, the temperature of the cooking vessel, the temperature of the food material, the value of "F", the pressure, the pH, the degree of sugar, the degree of salt and the concentration of nitrogen.

What is claimed is:
1. A heating, cooking and disinfecting apparatus comprising:
a hermetic type of pressurizing-and-depressurizing cooking vessel defining an inside and a bottom, and having a plurality of nozzles in said arranged inside, said nozzles being joined together and to a supply conduit assembly, said cooking vessel having a return conduit and a drain outlet provided on said bottom;

a heat exchanger having an inlet and an outlet connected to said return conduit and said supply conduit assembly respectively, thereby forming a circulation channel;

a water supply;

a seasoning liquid supply;

a steam supply;

a cold water supply;

a superheated vapor supply;

a heated nitrogen supply; and a control wherein:

said water supply and said seasoning liquid supply being arranged so as to be connected alternatively to said circulation channel via associated valves whereas said steam supply, cold water supply, superheated vapor supply and heated nitrogen supply being so arranged that any one of these supplies and said outlet of said heat exchanger may be connected alternatively to said circulation channel downstream of said supply conduit assembly, said cooking vessel having a temperature detecting sensor, a pressure detecting sensor and a nitrogen concentration detecting sensor installed therein; and said control being responsive to signals from all of the selecting sensors for permitting said nozzles to shower the food material with the seasoning liquid, water, steam, superheated vapor, heated nitrogen or cold water according to the sequencer program associated with said control; thereby cooking and disinfecting the food material in said cooking vessel.

2. A heating, cooking and disinfecting apparatus according to claim 1, wherein said supply conduit assembly includes a center supply conduit standing upright at the center of said cooking vessel and plurality of surrounding supply conduits arranged on the inner circumference of said cooking vessel, and the nozzles of the surrounding supply conduits are arranged in radial directions to surround the center supply conduit, so that the radial nozzles are distributed evenly within the cooking vessel.

3. A heating, cooking and disinfecting apparatus according to claim 2, further comprising: an annular food-accommodating shelf assembly in said cooking vessel, said center supply conduit stands in the center circular space of said shelf assembly and said surrounding supply conduits being arranged around said annular shelf assembly.

4. A heating, cooking and disinfecting apparatus according to claim 2, wherein said shelf assembly has a plurality of shelves, and said nozzles are arranged at the levels of the shelves.

5. A heating, cooking and disinfecting apparatus according to claim 2, wherein each shelf has a plurality of holes therein.

* * * * *